(12) United States Patent
Gokkel

(10) Patent No.: US 9,676,439 B2
(45) Date of Patent: Jun. 13, 2017

(54) COLLAPSIBLE VEHICLE

(75) Inventor: Paul Gokkel, Utrecht (NL)

(73) Assignee: NEWINNO BV, Utrecht (NL)

( * ) Notice: Subject to any disclaimer, the term of this patent is extended or adjusted under 35 U.S.C. 154(b) by 962 days.

(21) Appl. No.: 13/388,699

(22) PCT Filed: Aug. 4, 2010

(86) PCT No.: PCT/NL2010/050494
§ 371 (c)(1),
(2), (4) Date: Feb. 3, 2012

(87) PCT Pub. No.: WO2011/016722
PCT Pub. Date: Feb. 10, 2011

(65) Prior Publication Data
US 2012/0181772 A1    Jul. 19, 2012

(30) Foreign Application Priority Data

Aug. 5, 2009   (NL) ..................... 2003332

(51) Int. Cl.
*B62B 7/06*    (2006.01)
*B62B 7/10*    (2006.01)
(Continued)

(52) U.S. Cl.
CPC .............. *B62K 15/008* (2013.01); *B60F 1/00* (2013.01); *B62B 7/06* (2013.01); *B62B 7/10* (2013.01);
(Continued)

(58) Field of Classification Search
CPC ..... B62B 7/06; B62B 7/10; B62B 7/12; B60P 3/34; B60F 1/00

USPC ........... 296/181.7, 165, 26.01, 26.02, 26.03, 296/26.09, 136.05; 280/33.991, 33.992, 280/33.998
See application file for complete search history.

(56) References Cited

U.S. PATENT DOCUMENTS 2,428,954 A * 10/1947 Apblett et al. .................. 280/40
2,432,489 A * 12/1947 Schultheis .................... 280/647
(Continued)

FOREIGN PATENT DOCUMENTS

| CH | 346779 | 5/1960 |
|---|---|---|
| DE | 8908186 | 9/1989 |

(Continued)

OTHER PUBLICATIONS

International Search Report for PCT/NL2010/050494, Completed by the European Patent Office on Dec. 2, 2010, 5 Pages.

*Primary Examiner* — Joseph Rocca
*Assistant Examiner* — Daniel Yeagley
(74) *Attorney, Agent, or Firm* — Brooks Kushman P.C.

(57) ABSTRACT

A vehicle with a collapsible body. With this construction a one-person's vehicle can be folded together to a very compact size with the dimensions of an average suitcase. The body comprises two halves: a front and back part. Each of these parts contains a lower and upper hollow section. Each upper hollow section can slide telescopically in and out the lower hollow section, thus enlarging or reducing the length of the corresponding part. In the collapsed state both parts with all their sections are nested into each other. A further reduction of the volume of the collapsed vehicle can be achieved by using a chassis with two retractable slidable frame parts.

17 Claims, 11 Drawing Sheets

(51) Int. Cl.
   *B62B 7/12*      (2006.01)
   *B62K 15/00*     (2006.01)
   *B60F 1/00*      (2006.01)
   *B62J 17/08*     (2006.01)
   *B62K 5/027*     (2013.01)

(52) U.S. Cl.
   CPC ............. *B62B 7/12* (2013.01); *B62J 17/08* (2013.01); *B62K 5/027* (2013.01); *B62K 15/00* (2013.01)

(56) References Cited

U.S. PATENT DOCUMENTS

| | | | | |
|---|---|---|---|---|
| 2,727,750 | A * | 12/1955 | Noll | 280/33.996 |
| RE25,616 | E * | 7/1964 | Stanley | 280/33.993 |
| 3,245,498 | A * | 4/1966 | Stanley et al. | 280/33.995 |
| 3,679,223 | A * | 7/1972 | Sakal | 280/37 |
| 3,706,460 | A * | 12/1972 | Thomas | 280/33.995 |
| 4,057,282 | A * | 11/1977 | Kidd | 296/10 |
| 4,239,258 | A * | 12/1980 | Burris | 280/639 |
| 4,601,479 | A * | 7/1986 | Reinbold et al. | 280/33.996 |
| 4,768,806 | A * | 9/1988 | Tetreault | 280/656 |
| 5,415,284 | A * | 5/1995 | King | 206/315.6 |
| 5,478,096 | A * | 12/1995 | Ting | 280/30 |
| 6,637,549 | B1 * | 10/2003 | Lopacki | 182/127 |
| 6,662,743 | B1 * | 12/2003 | Rolfe | 114/344 |
| 6,742,789 | B1 * | 6/2004 | Nowak | 280/47.26 |
| 7,077,229 | B2 * | 7/2006 | Lee | 180/220 |
| 7,090,279 | B2 * | 8/2006 | Tahara | 296/78.1 |
| 7,201,431 | B1 * | 4/2007 | Calandruccio | 296/173 |
| 7,306,245 | B1 * | 12/2007 | Lowe | 280/47.18 |
| 7,845,653 | B2 * | 12/2010 | Katz | 280/47.34 |
| 8,172,239 | B1 * | 5/2012 | Boyd et al. | 280/33.992 |
| 8,505,960 | B1 * | 8/2013 | Shindelar et al. | 280/651 |
| 8,757,639 | B2 * | 6/2014 | Graffis | 280/30 |
| 2003/0102643 | A1 * | 6/2003 | Jung | 280/47.26 |
| 2005/0017480 | A1 * | 1/2005 | Paganini | 280/638 |
| 2005/0040613 | A1 * | 2/2005 | Williams et al. | 280/30 |
| 2005/0236202 | A1 | 10/2005 | Walworth | |
| 2006/0027995 | A1 * | 2/2006 | Gu | 280/278 |
| 2006/0091625 | A1 * | 5/2006 | Naude et al. | 280/33.991 |
| 2009/0295127 | A1 * | 12/2009 | Wang | 280/639 |
| 2011/0023769 | A1 * | 2/2011 | Poston | 114/353 |

FOREIGN PATENT DOCUMENTS

| | | |
|---|---|---|
| DE | 29621710 | 2/1997 |
| DE | 29904644 | 6/1999 |
| FR | 28598 | 3/1925 |
| FR | 2649064 | 1/1991 |
| FR | 2851984 | 9/2004 |
| GB | 102537 | 12/1916 |
| GB | 1383997 | 2/1975 |
| JP | 58122265 | 7/1983 |
| WO | 9903724 | 1/1999 |

* cited by examiner

COLLAPSIBLE VEHICLE

CROSS-REFERENCE TO RELATED APPLICATION

This application is the U.S. national phase of PCT Appln. No. PCT/NL2010/050494 filed Aug. 4, 2010, which claims priority to Netherlands application NL 2003332 filed Aug. 5, 2009 the disclosures of which are incorporated in their entirety by reference herein.

BACKGROUND

1. Field of the Invention

The present invention relates to a vehicle with a collapsible body. With this system a one-person vehicle can be collapsed to very compact dimensions of the size of an ordinary suitcase.

RELATED ART

In the patent literature many collapsible vehicles are described: GB1383997 (1974 Greppi) describes a vehicle, whose front and back side can be folded to reduce the size of the vehicle. JP 58122265 (1983 Nakamatsu) describes a vehicle, the length of which can be reduced using a scissor construction. DE 8908186 (1989 Schausten) and DE 29621710 (1996 Schausten) describe a vehicle with a body that comprises slidable and nested side- and roof-panels that move along a guide brace. US 2005/236202 (2005 Walworth) describes a vehicle with a collapsible roof structure.

BRIEF SUMMARY

The present invention relates to a collapsible construction, that further reduces the volume of the collapsed state as compared to the above mentioned vehicles. The body consists of two parts: a front part and a back part. Each part comprises an upper and lower hollow section. Each upper hollow section can telescopically slide inward and outward in the lower hollow section to reduce or increase the length of the corresponding part. The hollow sections can have the shape of a rectangular box or semicylinder.

If the upper hollow section of one part is telescoped into the lower hollow section, the other part can be turned around this part and so the first said part is nested inside the second said part of which the upper hollow section can also be telescoped into the lower hollow section. In this way the volume of the body can be reduced by three-quarter. A further reduction of the volume of the collapsed body can be realized through a chassis which encompasses two telescoping frame members, such that the front body part is attached to the front frame member and the back body part is attached to the back frame member.

DETAILED DESCRIPTION OF THE PREFERRED EMBODIMENTS

Figure 1:
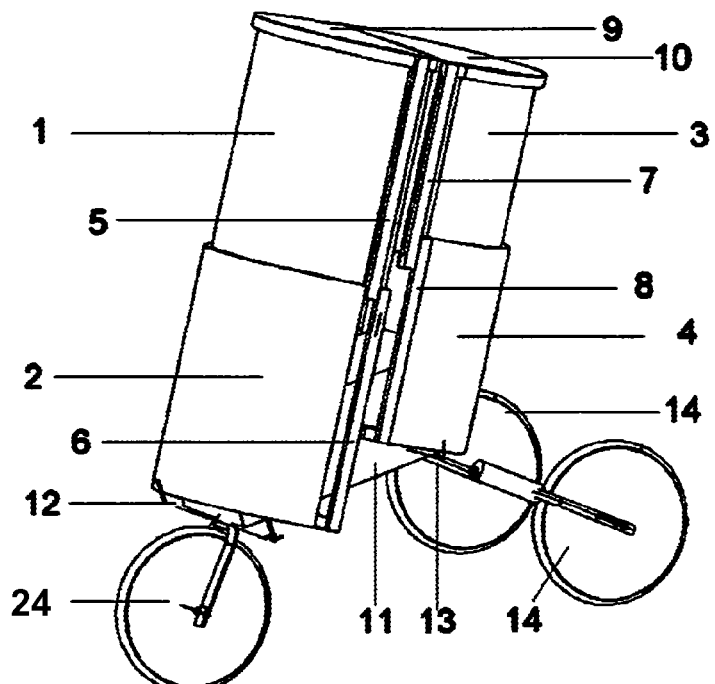
FIG. 1 shows a folded out vehicle for a single person.

The present invention will be further elucidated here below with reference to the annexed figures of several examples of embodiments: FIG. 1 shows the folded-out vehicle in which there is space for one person. The front part comprises an upper hollow section 1 and a lower hollow section 2, which have the shape of a hollow semicylinder in this figure. The upper hollow section 1 comprises two guides 5, which can slide telescopically in the corresponding guides 6 of the lower hollow section 2. For extra strength more than two pairs of guides 5 and corresponding guides 6 can be used. The upper hollow section 1 comprises at its top a cover 9, which in this semicylindrical design has a semicircular surface. The lower hollow section 2 can comprise a similar cover at its bottom. The back part of the body comprises an upper hollow section 3 and a lower hollow section 4, which also have the shape of a hollow semicylinder in this figure. The upper hollow section 3 comprises two guides 7, which can slide telescopically in the corresponding guides 8 of the lower hollow section 4. For extra strength more than two pairs of guides 7 and corresponding guides 8 can be used. The upper hollow section 3 comprises at its top a cover 10, which in this semicylindrical design has a semicircular surface. The lower hollow section 4 can also comprise a similar cover at its bottom.

The lower section 2 of the front part of the body is hingedly connected with a hinge 12 to the chassis 11. The lower section 4 of the back part of the body is hingedly connected with a hinge 13 to the chassis 11. This chassis 11 is, in this here depicted embodiment of the invention, a rectangular box with a front wheel 24 at its front and two rear wheels 14 attached to its back. An electric motor can be placed in the front wheel 24 for the propulsion of the vehicle. Instead of this in an alternative design the electric motor can propel the back wheels 14 or the back wheels are driven by pedals and a chain. In the FIGS. 2 to 5 (inclusive) the folding-together process of the vehicle's body is depicted.

Figure 2:
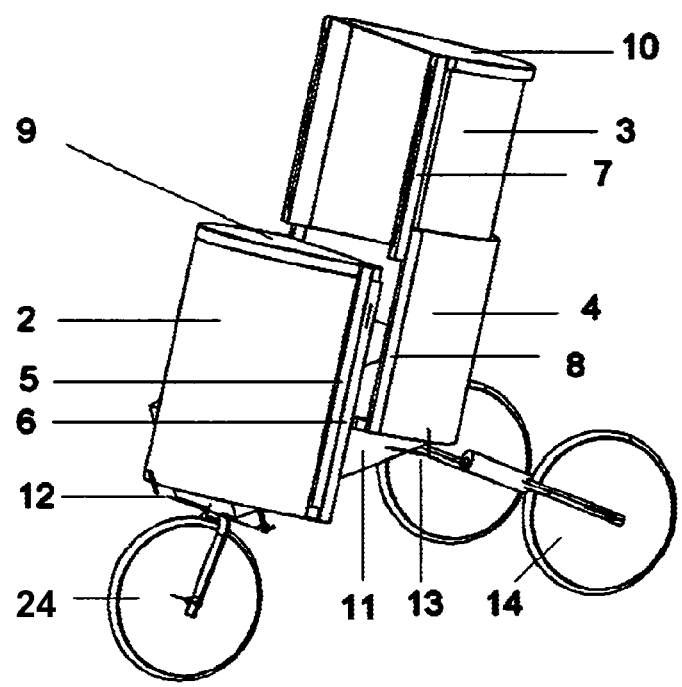
FIG. 2 shows the first phase of the folding process.

FIG. 2 shows the first phase of the folding-together process with the upper section 1 of the front part slid into the lower section 2 of said front part.

Figure 3:
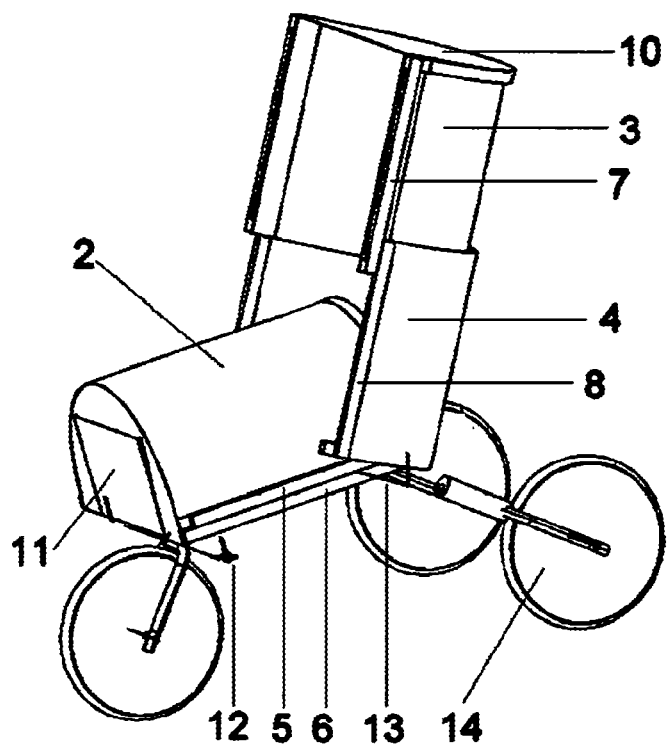
FIG. 3 shows the first body rotated to the refracted position.

FIG. 3 depicts the vehicle after this retracted front part is turned about the hinge 12 and is flat-lying onto the chassis 11. For this the vehicle's steer must be folded in/turned over too.

Figure 4:
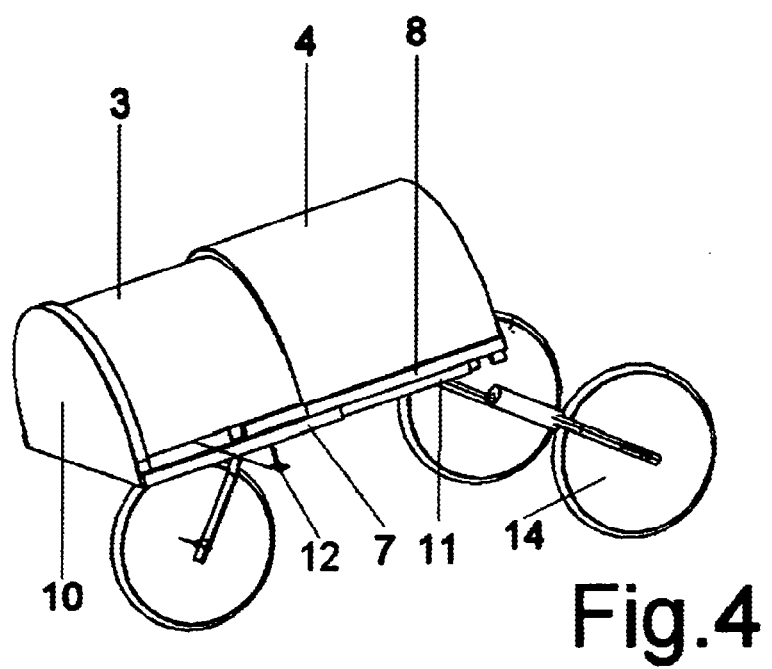
FIG. 4 shows the second body part rotated to the retracted position.

FIG. 4 shows the vehicle's configuration after turning over the back part of the body about the hinge 13 such that said back part is lying flat on the retracted front part.

Figure 5:
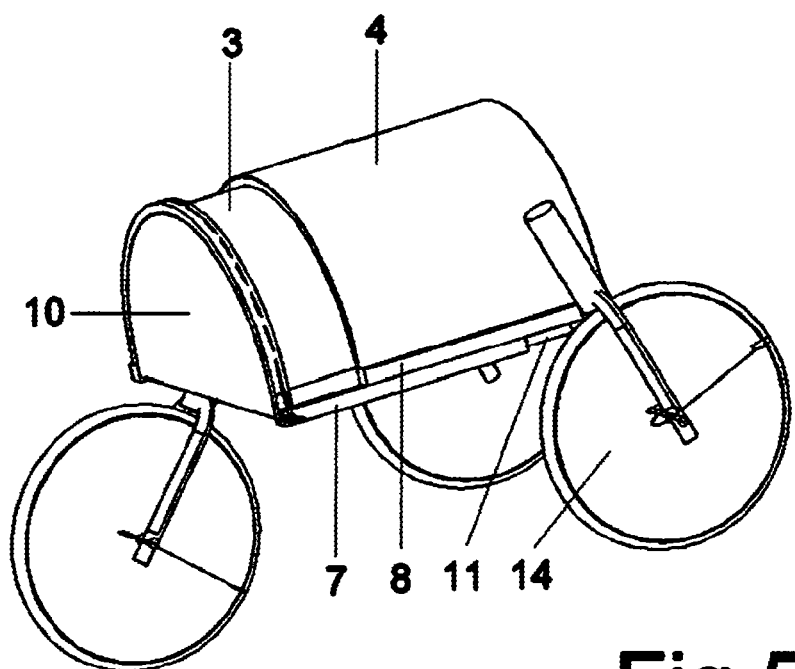
FIG. 5 shows the second body part in a collapsed configuration.

FIG. 5 depicts the final position of both collapsed nested parts in the folded-in configuration, with the upper section 3 is slid into the lower section 4 of the back part. The wheels 14 and 24 can be designed as detachable from the chassis. When the wheels 14 and 24 are uncoupled from the chassis 11 they can be stored within the inner hollow section 1 of the nested sections of both parts. In another embodiment of the invention, after collapsing both parts of the body, both back wheels 14 together with their forks are turned over such that they either lie flat on the bottom of the chassis 11 or the back forks with the back wheels are rotated about an axis parallel to the wheel axles and reside next to the collapsed nested hollow body parts. The front wheel 24 and its fork can also be tilted because said fork comprises two hinged elements. By turning the front wheel and tilting the fork, the front wheel can lie flat onto the bottom of the chassis. This yields a significant space reduction.

Figure 6:
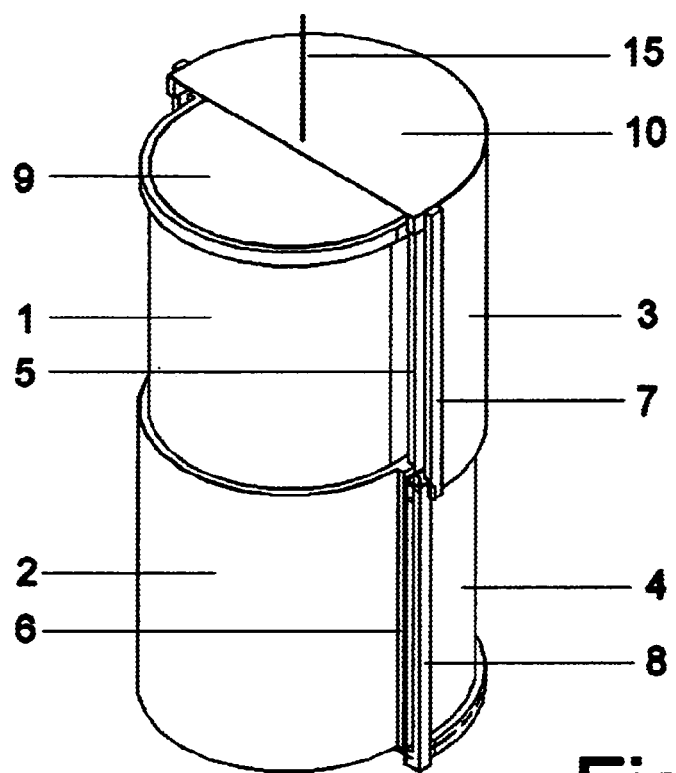
FIGS. 6, 7 and 8 illustrate an alternative embodiment in the direct partially collapsed and fully collapsed positions.
Figure 7:
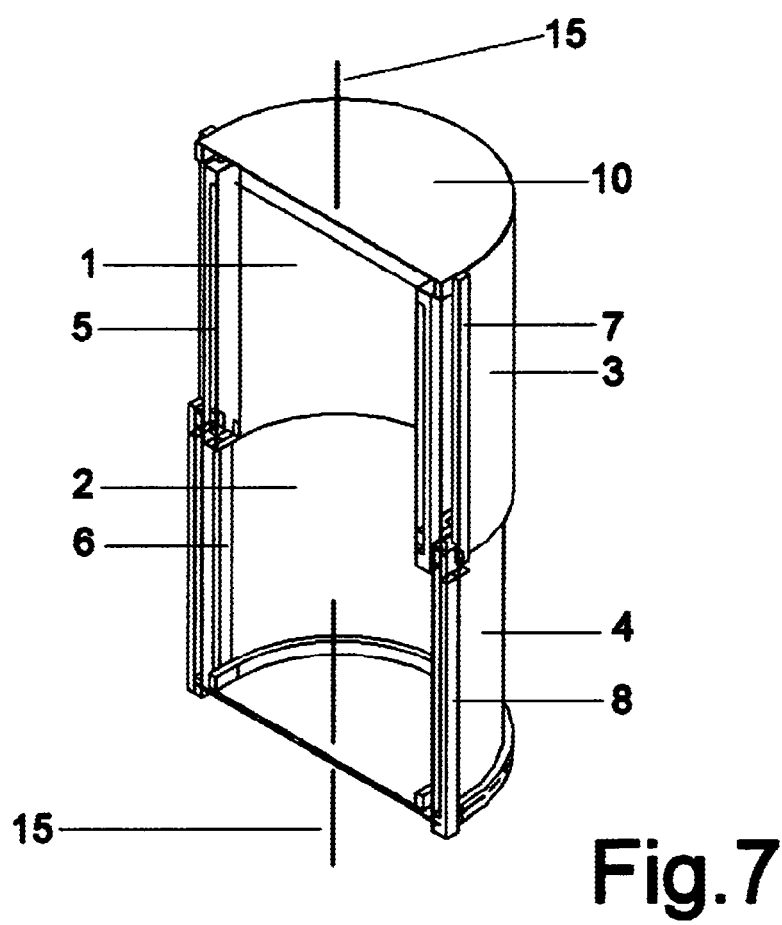

FIGS. 6 and 7 show an alternative embodiment of the present invention. In FIG. 6 the folded-out configuration is shown of a vehicle's body that again comprises two body parts. The first part includes preferably two halfcylindrical sections with one section 1 sliding in another section 2. Section 1 has a guide 5 which telescopes in the corresponding guide 6 of section 2. The second part includes preferably two halfcylindrical sections with one section 3 sliding in another section 4. Section 3 has a guide 7 which telescopes in the corresponding guide 8 of section 4. The first mentioned part has slightly smaller outside dimensions than said second part and can turn around a vertical rotation axis 15. This rotation axis 15 can be designed as a pin or bolt through both covers 9 and 10 and a corresponding pin or bolt through both bottom covers for a rotatable mutual attachment. In FIG. 7 is depicted the state of the folding-in process with said first smaller part is turned over approximately 180 degrees about the vertical rotation axis 15 and said first part is completely or largely enclosed in said second bigger part.

Figure 8:
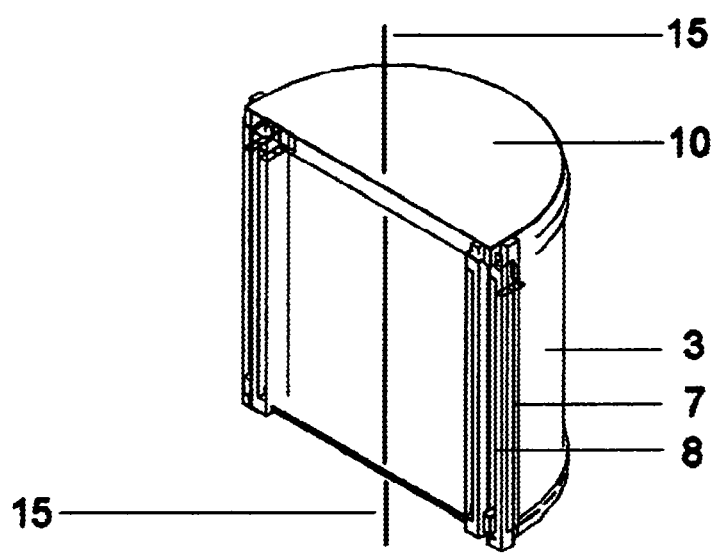

In FIG. 8 the final state of the collapsing process is shown. Here all nested sections of both parts are slid into each other along their guides.

Figure 9:
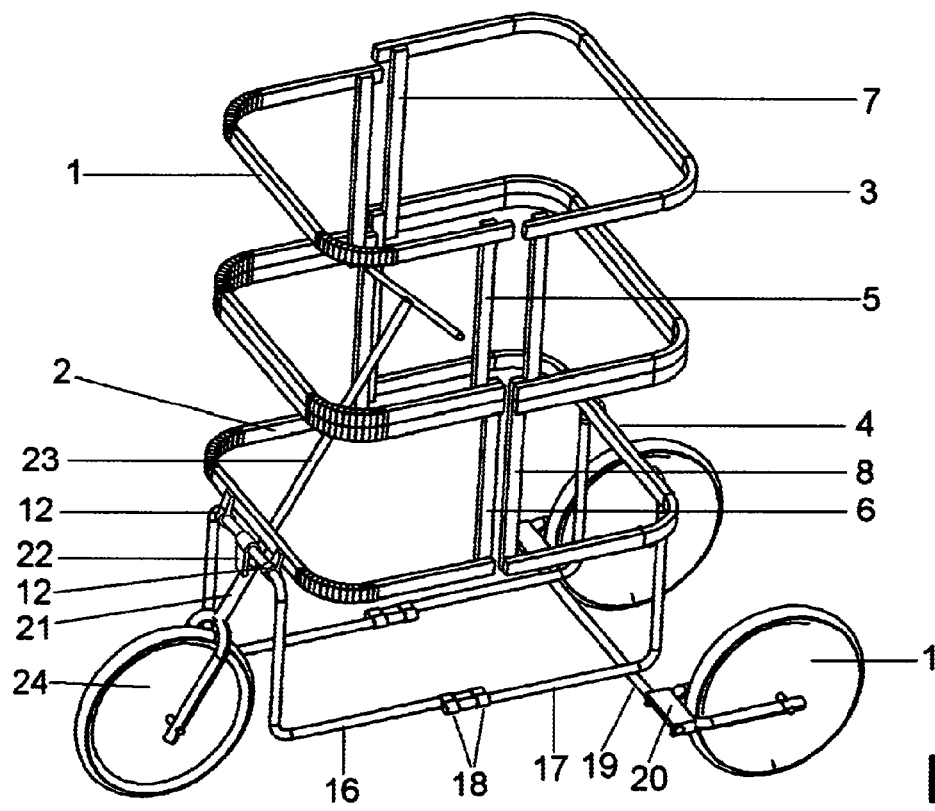
FIG. 9 illustrates a third embodiment in the unfolded state.

In FIG. 9 another variant of the invention is depicted with a chassis which includes a front frame member 16 and a back frame member 17, which can slide inward and outward with respect to each other along guides 18. Each guide 18 can be designed as a block with two round holes, through which the round legs of the frame members 16 and 17 can slide.

The vehicle again comprises a front part with an upper hollow section 1 and a lower hollow section 2. Both said sections are here (rounded) box-shaped. The upper hollow section 1 includes two guides 5, which can telescopically slide inward and outward in the corresponding guides 6 of the lower hollow section 2. For the sake of clarity the body panels and covers are not depicted in this and the next figures. The lower hollow section 2 of the front part of the body is hingedly connected with hinges 12 to the front frame member 16. The vehicle also includes a back part with an upper hollow section 3 and a lower hollow section 4, which are here (rounded) box-shaped. The upper hollow section 3 includes two guides 7, which can telescopically slide inward and outward in the corresponding guides 8 of the lower hollow section 4, The lower hollow section 4 of the back part of the body is hingedly connected with hinges 13 to the back frame member 17 (See FIG. 11). In this embodiment of the invention a front fork 21 is suspended to the top of the front frame member 16 with a hinge 22. The steer 23 is hingedly attached to this fork 21. Both back wheels 14 are each mounted in a back fork 20. Said forks 20 being mounted on a rear axle 19, which is attached to the back frame member 17. The two back forks 20 can slide along and rotate about this rear axle 19.

Figure 10:
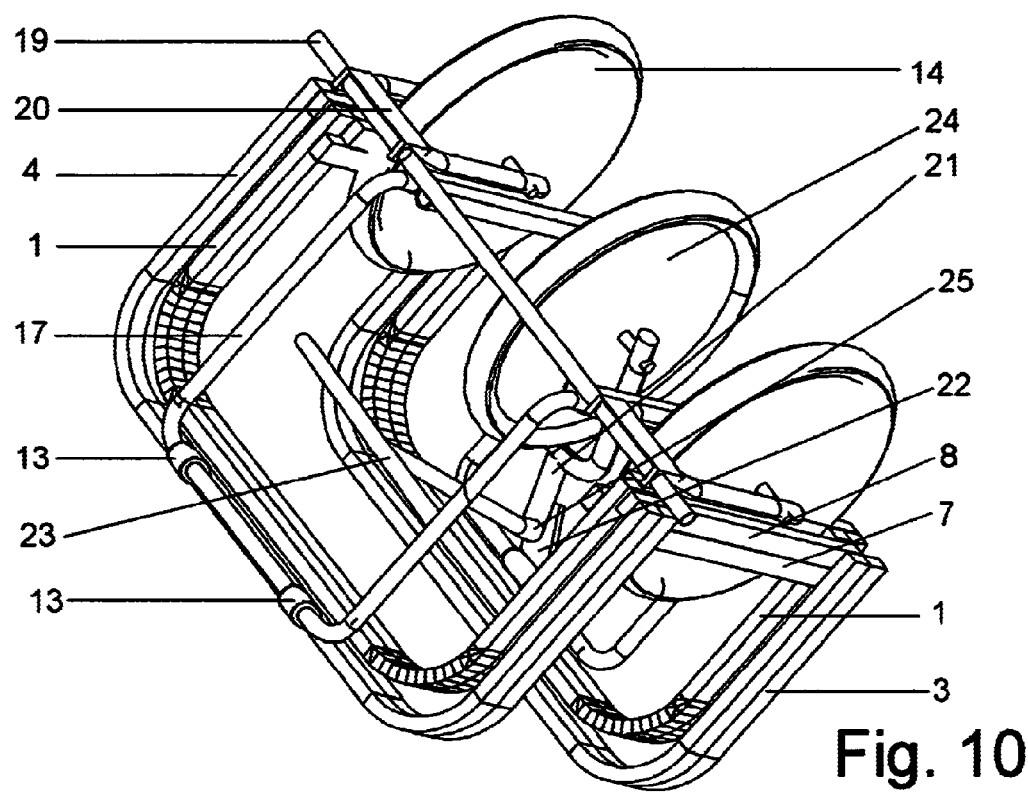
FIG. 10 illustrates the third embodiment in the collapsed state.

FIG. 10 shows the folded-in configuration of this embodiment of the collapsible vehicle, as seen from its back. The front frame member 16 of the chassis is slid inward into the back frame member 17 of the chassis. The front part of the body has its upper hollow section 1 telescoped into the lower hollow section 2 and next this front part of the body is turned over 90 degrees about the front frame member 16 with hinges 12. (See FIG. 9).

Similarly the back part of the body has its upper hollow section 3 telescoped into the lower hollow section 4 and next this back part of the body is turned over 90 degrees about the back frame member 17 with hinges 13.

The front fork 21 with the front wheel 24 and the steer 23 are turned about the horizontal top of the front member 16 by a tube hinge 22 such that said fork 21 with the front wheel 24 are located inside the body of the collapsed vehicle. At this the steer 23 is also turned over its attachment to the front fork 21 by means of a second tube hinge 25. Both back forks 20 with their mounted back wheels 14 are moved to the central part of the rear axle 19 and are then turned over 180 degrees about this rear axle 19 to the front so that both back forks 20 with their back wheels 14 reside in the interior of the nested collapsed hollow parts of the body. In this way the front wheel 24 is lying between and parallel to both back wheels 14 in the interior of the collapsed vehicle. This gives a significant reduction of space.

In another embodiment of the invention this front wheel 24 is rotated 90 degrees and tilted by the tube hinge 25 after which the front wheel 24 is lying flat on the bottom of the chassis between both back wheels 14.

Figure 11:
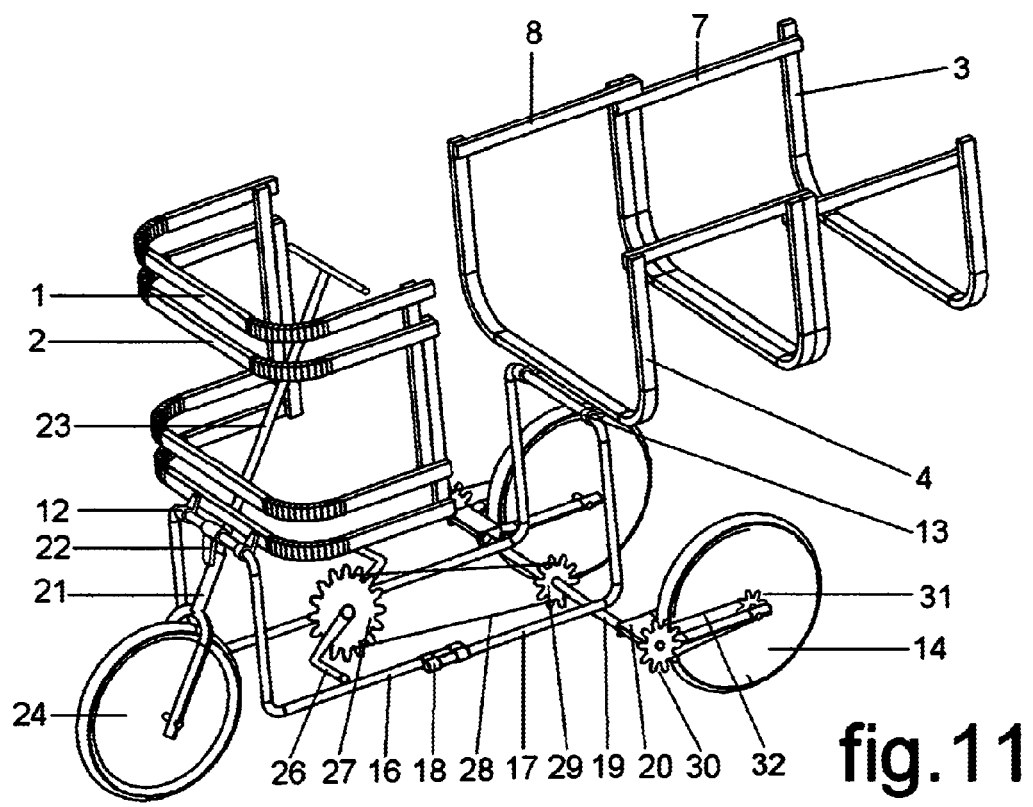
FIG. 11 illustrates a fourth embodiment in the erect but open position to enable an occupant entry.

FIG. 11 shows another preferred embodiment of the invention in which upper hollow section 1 of the front body part is telescoped into the lower hollow section 2 of the front body part and constitutes the bonnet/hood of the vehicle which encloses the steer 23. For the sake of clarity the body panels, covers and seats are not depicted in this and the preceding figures. The back part with its upper hollow section 3 and lower hollow section 4, can be turned backwards and secured in a horizontal position with both hollow sections of this back part are extended outward to increase their total volume. This back part can serve now as a cargo space for the vehicle. Similarly the front part can be turned forward and secured in a horizontal position, with its hollow sections extended, to serve as the front cargo space.

Furthermore in this figure pedals and a chain are depicted which drive this carrier-tricycle. The pedals 26 are mounted on a chain wheel 27, which drives a chain or belt 28. In the middle of the hollow rear axle 19 a second chain wheel 29 is situated. This chain wheel 29 is firmly attached by means of an internal drive shaft within the rear axle 19 to two chain wheels 30 on both ends of that drive shaft at the ends of the rear axle 19. The two chain wheels 30 drive a chain or belt 32 on each back fork 20, which propel a secondary chain wheel 31 on each back wheel 14.

It will be apparent to the skilled person that the inventive concept allows a wide application and is certainly not limited to the given embodiments, which serve only by way of illustration.

The invention claimed is:
1. A collapsible vehicle comprising:
a chassis;
at least two wheels connected to the chassis; and
a collapsible body including:
   a first half having a first main portion with a first pair of longitudinal edges and a first curved sidewall extending between the first longitudinal edges, wherein a lower end of the first main portion is hingedly connected to a first portion of the chassis, and
   a second half having a second main portion with a second pair of longitudinal edges and a second curved sidewall extending between the second longitudinal edges, wherein a lower end of the second main portion is hingedly connected to a second portion of the chassis that is spaced apart from the first portion; wherein the collapsible body includes a driving configuration in which the first and second halves are pivoted to a generally upright position with each of the first longitudinal edges being adjacent to a corresponding one of the second longitudinal edges to define a passenger cabin, the body includes a folded configuration in which the first half is folded over the chassis and the second half is folded over the first half such that the first curved sidewall is nested within the second curved sidewall with the first and second curved sidewalls overlapping to collapse the passenger cabin for storage of the vehicle, and the first half further includes an upper segment and a lower segment telescopically connected and slidable relative to each other between an extended position and a retracted position, wherein the upper and lower segments are in the extended position when the body is in the driving configuration and are in the retracted position when the body is in the folded configuration.

2. The collapsible vehicle of claim 1, wherein the first half further includes a cover connected to the first curved sidewall, and the second half further includes a cover connected to the second curved sidewall, wherein the covers cooperate to form a roof of the passenger cabin when the body is in the driving configuration.

3. The collapsible vehicle of claim 1, wherein the second curved sidewall completely overlaps the first curved sidewall when the body is in the folded configuration.

4. The collapsible vehicle of claim 1, wherein the first half further includes a pair of guides each located on one of the first longitudinal edges and connected between the upper and lower segments.

5. The collapsible vehicle of claim 1 further comprising a pedal mechanism mounted to the chassis and drivingly connected to at least one of the at least two wheels enabling an occupant of the vehicle to propel the vehicle.

6. The collapsible vehicle of claim 1, wherein the at least two wheels is three wheels.

7. A collapsible vehicle comprising:
a chassis;
at least two wheels connected to the chassis;
first and second body pieces each having a curved sidewall;
a first hinge connected to a lower end of the first body piece and to a first portion of the chassis;
a second hinge connected to a lower end of the second body piece and to a second portion of the chassis that is spaced apart from the first portion; and
a cover attached to an upper end of the first body piece and projecting outwardly from the curved sidewall of the first body piece; wherein
in a driving configuration of the vehicle, the first and second body pieces are pivoted about the first and second hinges, respectively, to a generally upright position in which the curved sidewalls are adjacent to each other to form sides of a vehicle body and in which the cover forms a roof of the vehicle body that cooperates with the sides to define a substantially cylindrical enclosure,
in a storage configuration of the vehicle, the first and second body pieces are pivoted downwardly about the first and second hinges, respectively, such that the first and second pieces are folded over each other to collapse the vehicle body, and in the storage configuration, the first body piece is nested within the second body piece with the second body piece completely overlapping the first body piece.

8. The collapsible vehicle of claim 7 further comprising a second cover attached to an upper end of the second body piece and projecting outwardly from the curved sidewall of the second body piece, wherein the second cover cooperates with the cover to form the roof when in the driving configuration.

9. The collapsible vehicle of claim 7, wherein the first body piece further includes a lower section connected to the first hinge and an upper section telescopically connected to the lower section.

10. The collapsible vehicle of claim 9, wherein the second body piece further includes a lower section connected to the second hinge and an upper section telescopically connected to the lower section of the second body piece.

11. The collapsible vehicle of claim 7 further comprising an electric motor that propels one of the at least two wheels.

12. The collapsible vehicle of claim 7, wherein one of the at least two wheels is a front wheel that is connected to a steering mechanism operable to move the front wheel.

13. A collapsible vehicle comprising:
a chassis;
at least a front wheel and a back wheel connected to the chassis;
a steering mechanism connected to the front wheel; and
a collapsible body including:
a front component having a generally semi-circular or U-shaped cross section, and
a back component having a lower end pivotally attached to a rear portion of the chassis and having a first section and a second section that each have a generally U-shaped or semi-circular cross section, wherein the front component and the back component are rotatable relative to each other, about a common axis, between an open position in which the front component is nested within the back component, and an encircled position in which the front and back components define an enclosure; wherein
the collapsible body includes a driving configuration in which the front and back components are folded to a substantially upright position and the front and back components are rotated to the encircled position,
the collapsible body includes a collapsed configuration in which the back component is folded over the chassis with the front and back components in the open position, and
the first section and the second section are telescopically connected and slidable relative to each other between an extended position and a retracted position, and the first and second sections are in the extended position when the body is in the driving configuration and are in the retracted position when the body is in the collapsed configuration.

14. The collapsible vehicle of claim 13, wherein each of the first and second sections has a curved sidewall.

15. The collapsible vehicle of claim 13, wherein a diameter of the second section is less than a diameter of the first section allowing the second section to nest within the first section when in the open position.

16. The collapsible vehicle of claim 13 further comprising an electric motor that propels one of the wheels.

17. The collapsible vehicle of claim 13 further comprising a pedal mechanism mounted to the chassis and drivingly connected to at least one of the wheels enabling an occupant of the vehicle to propel the vehicle.

* * * * *